US012575505B2

(12) United States Patent
Yacktman

(10) Patent No.: US 12,575,505 B2
(45) Date of Patent: Mar. 17, 2026

(54) SUPPORT PLATFORM FOR HOLDING BUCKETED PLANTS

(71) Applicant: Stephen A Yacktman, Austin, TX (US)

(72) Inventor: Stephen A Yacktman, Austin, TX (US)

( * ) Notice: Subject to any disclaimer, the term of this patent is extended or adjusted under 35 U.S.C. 154(b) by 39 days.

(21) Appl. No.: 18/615,243

(22) Filed: Mar. 25, 2024

(65) Prior Publication Data

US 2025/0295078 A1    Sep. 25, 2025

(51) Int. Cl.
*A01G 9/04* (2006.01)
*A01G 27/02* (2006.01)

(52) U.S. Cl.
CPC .............. *A01G 9/045* (2013.01); *A01G 27/02* (2013.01)

(58) Field of Classification Search
CPC .......... A01G 27/02; A01G 9/045; A01G 9/02; A01G 9/047
USPC .......................................................... 47/65.5
See application file for complete search history.

(56) References Cited

U.S. PATENT DOCUMENTS

| | | | |
|---|---|---|---|
| D438,100 S * | 2/2001 | Cekota | D9/755 |
| 8,555,547 B2 | 10/2013 | Hashimoto et al. | |
| 8,689,819 B2 | 4/2014 | Hashimoto et al. | |
| 10,285,335 B1 | 5/2019 | Murphy | |
| 2008/0302009 A1 * | 12/2008 | Frecon | A01G 9/022 47/65.5 |

| | | | | |
|---|---|---|---|---|
| 2010/0162623 A1 * | 7/2010 | Mathy | E01C 9/004 47/79 |
| 2010/0307057 A1 * | 12/2010 | Hashimoto | E04D 11/002 47/79 |
| 2010/0325952 A1 * | 12/2010 | Young | A01G 31/00 47/79 |
| 2014/0311027 A1 * | 10/2014 | Contillo | A01G 9/143 47/66.7 |
| 2017/0164565 A1 * | 6/2017 | Noordam | A01G 9/045 |
| 2019/0261586 A1 * | 8/2019 | Hoff | A01G 31/00 |
| 2021/0204490 A1 * | 7/2021 | Bartrom | A01G 9/042 |
| 2022/0279729 A1 * | 9/2022 | MacKenzie | A01G 9/045 |

FOREIGN PATENT DOCUMENTS

| | | | | |
|---|---|---|---|---|
| KR | 200369931 Y1 * | 12/2004 | | A01G 27/02 |
| KR | 20070027940 A | 3/2007 | | |
| KR | 20110009314 | 10/2011 | | |
| KR | 20130007101 A | 12/2013 | | |
| KR | 102324188 A | 6/2021 | | |
| WO | WO-2015117685 A1 * | 8/2015 | | A01G 27/008 |

* cited by examiner

*Primary Examiner* — Zoe Tam Tran
(74) *Attorney, Agent, or Firm* — Thomas W. Galvani, P.C.; Thomas W. Galvani

(57) ABSTRACT

A support platform for holding bucketed plants includes a top and an opposed bottom, a sidewall extending therebetween, and a reservoir bounded by the sidewall. Seats formed into the top, the seats defining depressions shallowly recessed below a top surface. A channel extends between the seats, the channel shallowly recessed below the top surface, and the channel joining the seats in fluid communication with each other. A drain is in the channel and is configured to drain fluid from the channel into the reservoir bounded by the sidewall.

10 Claims, 5 Drawing Sheets

SUPPORT PLATFORM FOR HOLDING BUCKETED PLANTS

FIELD

The present specification relates generally to agriculture, and more particularly to agricultural cultivation.

BACKGROUND

Agricultural cultivation presents the possibility for precise control of watering, nutrition, soil conditions, and temperature and sun. This is a major benefit to improving the quality and quantity of production. However, it is not without challenges. For instance, storing and cultivating bucketed plants can be a messy enterprise. Home gardens are often littered with discarded pots, used plant trays, tangled spaghetti lines, and water spills and drips. At scale, cultivating facilities packed with disorganized plants can be a challenge to administer and a drain on profit. Without a tidy way to store plants, cultivating sites are often dirty. Watering becomes a chore, and monitoring water consumption and water waste is difficult.

Transporting cultivated plants is also difficult. Bucketed plants tip easily when loaded onto carts. They drop dirt and water wherever they are moved. This raises the risk of slip-and-fall accidents.

While transporting plants is difficult, it is nonetheless often important and necessary to do so as to help the plants grow. Many plants cannot be exposed to extremes such as freezes or high temperatures. When plants are removed from their pots and planted into the ground, they are placed somewhat at the mercy of the weather. For example, in places like Texas, where there can be large and rapid swings in weather conditions, planted trees and vegetables can receive warm sun one day and hail the next.

Placing plants outside as soon as possible allows them to have the longest growing season possible before temperatures get too hot. And when temperatures do get hot, the plants should be moved out of the sun and heat quickly or they will wilt. When plants are placed in the ground, however, they cannot be moved quickly and easily to adapt to the weather.

There is a need for an improved system for storing, transporting, and growing bucketed plants.

SUMMARY

In an embodiment described herein, a support platform allows for bucketed plants to be grown indoors, such as in a tent, a growing facility, or in an air-conditioned or heated space, and then moved outdoors as needed as a single unit. The platform not only holds the buckets supporting the plants, but holds any liquid solution for watering the plants as well as a system—such as a cage or cages—for supporting the plants.

In an embodiment, a support platform for holding bucketed plants includes a top and an opposed bottom, a sidewall extending therebetween, and a reservoir bounded by the sidewall. Seats formed into the top, the seats defining depressions shallowly recessed below a top surface. A channel extends between the seats, the channel shallowly recessed below the top surface, and the channel joining the seats in fluid communication with each other. A drain is in the channel and is configured to drain fluid from the channel into the reservoir bounded by the sidewall.

In embodiments, the platform includes voids surrounded by an inner sidewall separate from the sidewall of the platform. An inner sidewall, separate from the sidewall of the support platform, bounds and defines an internal void separated from the reservoir. At least one of the seats includes a cap removably secured in a mouth in the top, wherein when the cap is removed, the mouth defines an access to the reservoir. The sidewall includes a corner formed with an inwardly-directed notch extending vertically between the top and bottom. A plurality of vertical notches are formed into the sidewall, bounding the seats, and configured to receive cages around the seats.

In an embodiment, a support platform for holding plants includes a top and an opposed bottom, a sidewall extending therebetween, and a reservoir bounded by the sidewall. Seats are formed into the top, the seats defining depressions shallowly recessed below a top surface. A plurality of vertical notches are formed into the sidewall, bounding the seats, and configured to receive cages around the seats.

In embodiments, voids are surrounded by an inner sidewall separate from the sidewall of the platform. An inner sidewall, separate from the sidewall of the support platform, bounds and defines an internal void separated from the reservoir. At least one of the seats includes a cap removably secured in a mouth in the top, wherein when the cap is removed, the mouth defines an access to the reservoir.

A support platform includes a plurality of pod portions, wherein each pod includes a top, a bottom, a sidewall extending therebetween defining a pod reservoir, and a depression below the top defining a seat in the pod. A plurality of bridge portions extend between adjacent pod portions. Each bridge portion includes a bridge top, a bridge bottom, and a bridge sidewall extending therebetween. The pod portions and bridge portions are arranged with respect to each other in an array.

In embodiments, each bridge portion further includes a lateral projection in the sidewall and extends between adjacent pods. The lateral projection terminates inboard of the sidewalls of the adjacent pods. The array includes the pod portions, the bridge portions, and voids defined between the bridge portions. The voids are open and are bound by the sidewalls of the bridge portions. Each bridge portion includes another depression below the bridge top defining a channel, and the channel joins the seats of adjacent pods in fluid communication. Each of the pod portions and each of the bridge portions includes an upper and a lower. The uppers are formed continuously to each other as a single upper platform portion, and the lowers are formed continuously to each other as a single lower platform portion.

The bridge portions define bridge reservoirs that are joined in fluid communication with the pod reservoirs in the pod portions to form an internal reservoir for the support platform. The top of at least one of the pod portions includes a cap removably secured in a mouth in the top wherein, when the cap is removed, the mouth defines an access to the pod reservoir of the respective pod portion. Each pod portion includes a corner formed with an inwardly-directed notch extending vertically between the top and bottom.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
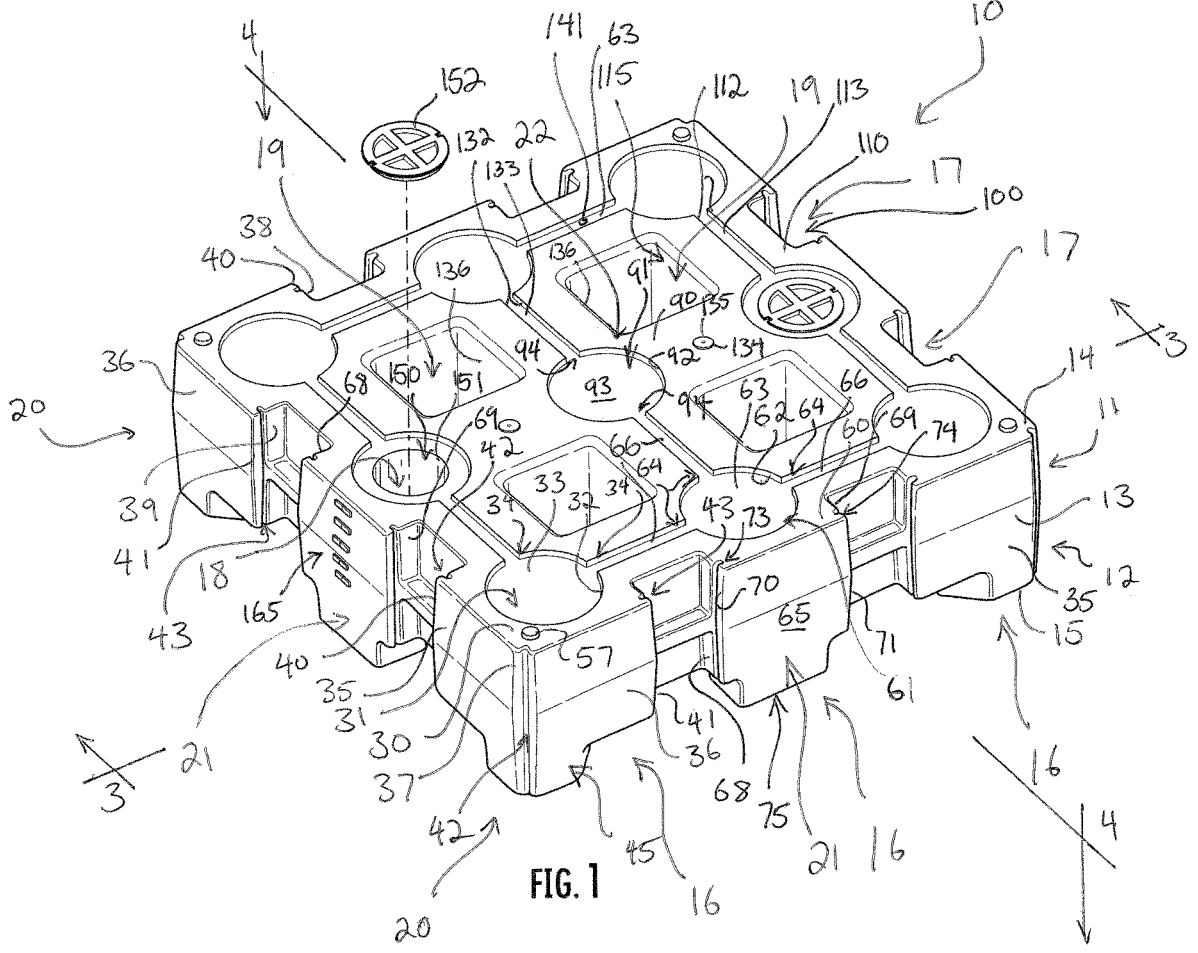
FIG. 1 is a top perspective view of a support platform for holding bucketed plants.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 is a top perspective view of a support platform for holding bucketed plants (hereinafter, "support platform 10" or just "platform 10") including an upper shell 11 and a lower shell 12 coupled to each other to form a sidewall 13 which extends between a top 14 of the platform 10 and a bottom 15 of the platform 10. The sidewall 13 is segmented and contoured to define a plurality of pod portions 16 and bridge portions 17 extending between adjacent pod portions 16. The platform 10 includes a single, continuous internal reservoir 18 bound by the sidewall 13 and by the top 14 and bottom 15.

The platform 10 is preferably organized on a rectangular or square grid, with the pod portions 16 and the bridge portions 17 arranged with respect to each other in an three-by-three array, and with internal voids 19 between the pod and bridge portions 16 and 17. The sidewall 13 bends inward and outward between corners of the array and between the top 14 and bottom 15 to define the pod portions 16, the bridge portions 17, and the structural elements and features in each. Each of the pod portions 16 bounds a pod reservoir 23, and each of the bridge portions 17 bounds a bridge reservoir 24 (see section views of FIGS. 3 and 4). The pod reservoirs 23 join the bridge reservoirs 24 in fluid communication to form the internal reservoir 18 as a single, continuous, uninterrupted reservoir for the platform 10.

Figure 2:
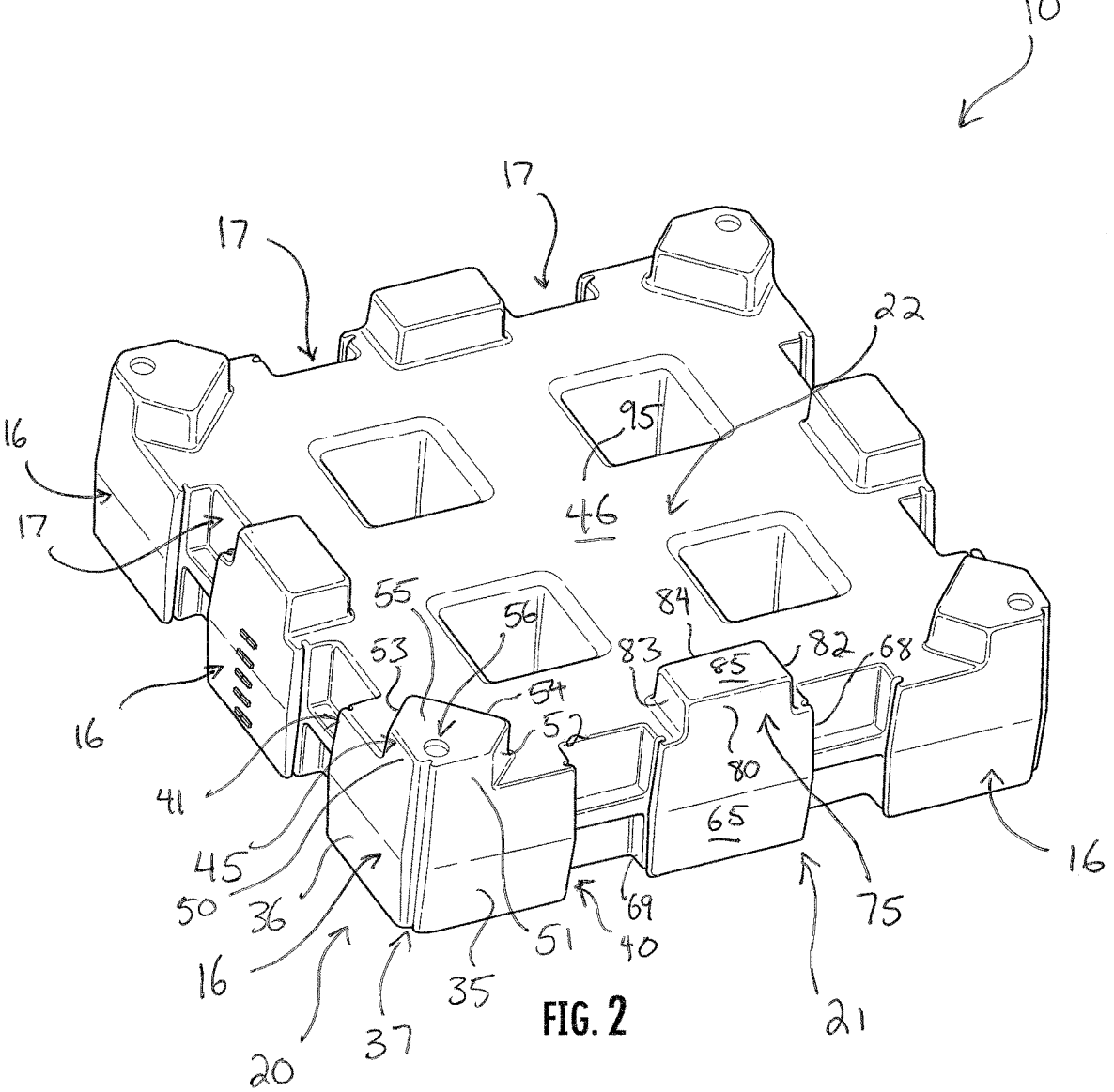
FIG. 2 is a bottom perspective view of the support platform.

There are three types of pod portions 16 shown in FIGS. 1 and 2: a corner pod 20, a side pod 21, and an inner pod 22.

Each is described below. The reader will understand that other platforms 10 within the scope of this disclosure will be laid out on a different array and may have a different number of corner, side, and inner pods 20, 21, and 22 and yet still retain the same structures and features as described here.

Each of the corner, side, and inner pods 20, 21, and 22 includes an upper and a lower, corresponding to the upper shell 11 and lower shell 12 at that pod 20, 21, or 22. Each of these uppers is formed continuously to the others to define the upper shell 11 as a single upper portion, and each of these lowers is formed continuously to the others to define the lower shell 12 as a single lower portion.

In the embodiment shown in these drawings, there are four corner pods 20. Each is identical to the other except in location. This description refers primarily to two corner pods 20 shown in FIG. 2 without distinction: the corner pod 20 at the center front of the drawing and the corner pod 20 at the left of the drawing.

The corner pod 20 extends between and includes the top 14 and bottom 15 of the platform 10. A top surface 30 is located at the top 14 of the corner pod 20. The top surface 30 is preferably level with respect to the platform 10. The top 14 includes a circular seat 31. The seat 31 is shallowly recessed below the top surface 30 and thus defines a slight depression with respect to the top surface 30 of the corner pod 20. The seat 31 is bound by a short, upstanding sidewall 32 projecting upward from a floor 33 of the seat 31 to the top surface 30. The sidewall 32 is circular and broken, severed at two gaps 34. The gaps 34 are oriented roughly ninety degrees apart from each on the circular sidewall 32. At the gaps 34, channels in the adjacent bridge portions 17 connect to the seat 31.

The sidewall 13 of the corner pod 20 has two major faces 35 and 36 which meet at and define an outer corner 37 of the corner pod 20. The sidewall 13 of the corner pod 20 additionally includes two minor faces 38 and 39. The minor face 38 and the major face 35 meet at and define a side corner 40, and the minor face 39 and the major face 36 meet at and define a side corner 41. The minor faces 38 and 39 are smaller than the major faces 35 and 36 and are oriented roughly perpendicularly to the major faces 35 and 36.

The outer corner 37 extends vertically entirely from the top 14 to the bottom 15. A notch 42 also extends vertically from the top 14 to the bottom 15, interrupting the outer corner 37. The notch 42 projects inwardly into the reservoir 18 so that the outer corner 37 has two outwardly-projecting vertical edges. The inwardly-directed notch 42 defines a receiving space for a slender wire, such as is used in tomato cages and the like.

Another notch 43 is formed into the minor face 38, also extending vertically like the notch 42. However, the minor face 38 at the side corner 40 is shorter than the major face 35 at the outer corner 37, and the notch 43 extends from the top 14 of the platform 10 to the bottom of the minor face 38. Unlike the notch 42, which is at the juncture of the two major faces 35 and 36, the notch 43 is laterally spaced apart from the side corner 40, just slightly inboard on the minor face 38. The notch 43 defines a receiving space for a slender wire, such as is used in tomato cages and the like.

Another notch 44 is formed into the minor face 39, also extending vertically. The minor face 39 at the side corner 41 is shorter than the major face 36 at the outer corner 37, and the notch 44 extends from the top 14 of the platform 10 to the bottom of the minor face 39. The notch 44 is laterally spaced apart from the side corner 41, just slightly inboard on the minor face 39. The notch 44 defines a receiving space for a slender wire, such as is used in tomato cages and the like. In some embodiments, the sidewall 13 around the notches 42, 43, and 44 bows out slightly to form a convex shape, allowing rods of plant cages to be snug fit into the notches 42, 43, and 44.

Proximate the bottom 15, the corner pod 20 has a foot 45, shown both in FIG. 1 and in the inverted view of FIG. 2. The foot 45 is a downward projection of an underside 46 of the platform 10. The platform 10 has a large, flat, relatively smooth underside 46 that extends across most of the platform 10, is common to the pod portions 16 and to the bridge portions 17. However, at the corner pod 20, proximate to the outer corner 37, the foot 45 depends downwardly from the underside 46. The foot 45 has a pentagonal shape. It has two vertical major faces 50 and 51 which are contiguous extensions and parts of the major faces 35 and 36. The major faces 50 and 51 are narrower than the major faces 35 and 36, extending approximately halfway between the outer corner 37 and side corners 40 and 41, respectively. The foot 45 then extends back from the major faces 35 and 36 along vertical minor faces 52 and 53 which are entirely below the underside 46 to an inner face 54, which is directed toward the middle of the underside 46. The foot 45 terminates at a bottom surface 55 at the bottom 15 of the platform 10. The bottom surface 55 is preferably level with respect to the platform 10.

Still referring to FIG. 2, a socket 56 extends upward into the foot 45. The socket 56 is a closed continuation of the wall of the platform 10. It is located proximate to the outer corner 37 and corresponds in size, shape, height, and location to a post 57 (in FIG. 1) projecting upwardly from the top surface 30 of the corner pod 20. When a user stacks platforms 10 one atop the other, registering and nesting the post 57 of one platform 10 with the socket 56 of another platform 10 directly mates the two platforms 10 and prevents them from sliding with respect to each other.

As noted above, this embodiment of the platform 10 includes four corner pods 20. Each is identical to the above description.

There are also four side pods 21 shown in these drawings. Each side pod 21 is disposed between two directly adjacent corner pods 20. Thus, on any side of the platform 10, there are two corner pods 20 and one side pod 21.

FIG. 1 shows two side pods 21 clearly in the foreground: one at the front and one on the left of the page. The side pod 21 extends between and includes the top 14 and bottom 15 of the platform 10. A top surface 60 is located at the top 14 of the side pod 21. The top surface 60 is preferably level with respect to the platform 10. The top 14 includes a circular seat 61. The seat 61 is shallowly recessed below the top surface 60 and thus defines a slight depression with respect to the top surface 60 of the side pod 21. The seat 61 is bound by a short, upstanding sidewall 62 projecting upward from a floor 63 of the seat 61 to the top surface 60. The sidewall 62 is circular and broken, severed at three gaps 64. The gaps 64 are oriented roughly ninety degrees apart from each on the circular sidewall 62. At the gaps 64, channels 66 in the adjacent bridge portions 17 connect to the seat 61.

The sidewall 13 of the side pod 21 has one major face 65. The major face 65 is coplanar to the major face 36 of the corner pod 20 at the center front of FIG. 1 and is also coplanar to the major face 35 of the corner pod 20 at the right front of FIG. 1. The sidewall 13 of the side pod 21 additionally includes two minor faces 68 and 69. The minor face 68 and the major face 65 meet at and define a side corner 70, and the minor face 69 and the major face 65 meet at and define a side corner 71. The minor faces 68 and 69 are smaller than the major face 65.

A notch 73 is formed into the minor face 68 extending vertically from the top 14 of the platform 10 to the bottom of the minor face 68. The notch 73 is laterally spaced apart from the side corner 70, just slightly inboard on the minor face 68. The notch 73 defines a receiving space for a slender wire, such as is used in tomato cages and the like.

Another notch 74 is formed into the minor face 69, also extending vertically from the top 14 of the platform 10 to the bottom of the minor face 69. The notch 74 is laterally spaced apart from the side corner 71, just slightly inboard on the minor face 69. The notch 74 defines a receiving space for a slender wire, such as is used in tomato cages and the like. In some embodiments, the sidewall 13 around the notches 73 and 74 bows out slightly to form a convex shape, allowing rods of cages to be snug fit into the notches 73 and 74.

Proximate the bottom 15, the side pod 21 has a foot 75, shown both in FIG. 1 and in the inverted view of FIG. 2. The foot 75 is a downward projection of an underside 46 of the platform 10. At the side pod 21, proximate to the major face 65, the foot 75 depends downwardly from the underside 46. The foot 75 has a rectangular shape. It has a vertical major face 80 which is a contiguous extension of the major face 65.

The major face 80 is slightly narrower than the major face 65. The foot 75 then extends back from the major face 80 along parallel, vertical minor faces 82 and 83 which are entirely below the underside 46 to an inner face 84, which is directed toward the middle of the underside 46 and is parallel to the major face 80. Because major face 80 of the foot 75 is narrower than the major face 65 above it, the minor faces 82 and 83 of the foot 75 are stepped back or recessed with respect to the minor faces 68 and 69. A thin portion of the underside 46 thus forms a shoulder between the minor face 68 and the minor face 82 and between the minor face 69 and the minor face 83. The foot 75 terminates at a bottom surface 85 at the bottom 15 of the platform 10. The bottom surface 85 is preferably level with respect to the platform 10.

FIG. 1 also shows a single inner pod 22 located centrally with respect to the corner and side pods 20 and 21. The inner pod 22 is at the juncture of four bridges extending inward from the side pods 21. The inner pod 22 extends between and includes the top 14 and bottom 15 of the platform 10. A top surface 90 is located at the top 14 of the inner pod 22 and is preferably level with respect to the platform 10. The top 14 includes a circulate seat 91. The seat 91 is shallowly recessed below the top surface 90 and thus defines a slight depression with respect to the top surface 90 of the inner pod 22. The seat 91 is bound by a short, upstanding sidewall 92 projecting upward from a floor 93 of the seat 91 to the top surface 90. The sidewall 92 is circular and broken, severed at two gaps 94. The gaps 94 are oriented roughly one-hundred eighty degrees apart from each other on the circular sidewall 92. At the gaps 94, the channels 66 in the adjacent bridge portions 17 connect to the seat 91.

Referring now to FIG. 2, along the underside 46, the inner pod 22 has a bottom surface 95. The bottom surface 95 is preferably smooth and level with respect to the platform 10. The bottom surface 95 is a constituent part of the underside 46 of the platform 10.

The pods portions 16 are connected to each other by the bridge portions 17. Each bridge portion 17 connects two adjacent pod portions 16. There are two types of bridge portions 17 shown in FIGS. 1 and 2: side bridges 100 and inner bridges 101. Each is described below. The reader will understand that other platforms laid out on a different array may have a different number of side and inner bridges 100 and 101 and yet still retain the same structures and features as described here.

In the embodiment shown in these drawings, there are eight side bridges 100. Each is identical to the other except in location. This description refers to the side bridge 100 shown in the back right of FIG. 1 and the front right of FIG. 3 (which is a section view taken along the line 3-3 of FIG. 1).

The side bridge 100 extends between and includes the top 14 and bottom 15 of the platform 10. A top surface 110 is located at the top 14 of the side bridge 100. The top surface 110 is preferably level with respect to the platform 10. One of the channels 66 extends longitudinally along a medial section of the top surface 110. The channel 66 is shallowly recessed below the top surface 110 and thus defines a slight depression with respect to the top surface 110 of the side bridge 100. The channel 66 is bound on two sides by short, upstanding sidewalls 112 projecting upward on either side of the channel 66 from a floor 113 of the channel 66 to the top surface 110.

The channel 66 connects two adjacent seats 31 at the gaps 34 and 64. The top surface 110 of the side bridge 100 is coplanar to the top surfaces 30 and 60 of the corner pod 20 and side pod 21, respectively, between which it extends. The channel 66 preferably has the same depth, between its floor 113 and its top surface 110, as do the seats 31 and 61 in the corner pod 20 and side pod 21, respectively. The channel 66 joins adjacent seats 31 and 61 in fluid communication with each other. Water or another fluid can flow easily from one seat 31, though the channel 66, to the other seat 61, or vice versa.

The sidewall 13 of the platform 10 defines an outer sidewall 114 of the side bridge 100 and an opposed inner sidewall 115 on the other side of the side bridge 100. The inner sidewall 115 has a single major face 116 which extends entirely from the top surface 110 to the underside 46 of the platform 10. The major face 116 is flat, smooth, preferably vertically-oriented, perpendicular to the layout of the platform 10.

The outer sidewall 114 has an upper face 120 and a lower face 121 separated by a lateral projection 122. The upper face 120 extends from the top surface 110 down to the lateral projection 122, and the lower face 121 extends from the underside 46 of the platform up to the lateral projection 122. The upper and lower faces 120 and 121 are smooth, flat, and coplanar to each other, spaced apart by the lateral projection 122.

The outer sidewall 114 extends between a corner pod 20 and a side pod 21. The outer sidewall 114 is mostly set back from the corner and side pods 20 and 21, however. The upper face 120 and the lower face 121 are each recessed with respect to the major faces 35, 36 and 65 of the corner and side pods 20 and 21, respectively. The lateral projection 122 that extends between the pods 20 and 21, however, projects laterally toward the major faces 35, 36 and 65 of those adjacent corner and side pods 20 and 21.

The lateral projection 122 has a roughly rectangular prismatic construction, with a vertical front face, a horizontal upper face normal to the front face, and a horizontal lower face normal to the front face and spaced apart from the upper face. The lateral projection 122 is open to the interior, joined in communication with the reservoir 18 inside the platform 10. The front face of the lateral projection 122 terminates flush with the notches 42 and 74 of the corner and side pods 20 and 21, respectively, or just inboard of the major faces of the corner and side pods 20 and 21, such that the lateral projection 122 provides access to the notches 42 and 74. The lateral projection 122 is useful as a handle when the platform 10 needs to be moved.

The inner pod 22 is connected to the side pods 21 by the inner bridges 101. Each of the inner bridges 101 is nearly identical, differing only in which side pod 21 they extend from and some of the structure on top of the side bridges 101, as is explained below.

Each inner bridge 101 extends between and includes the top 14 and bottom 15 of the platform 10. A top surface 130 is located at the top 14 of the inner bridge 101. The top surface 130 is preferably level with respect to the platform 10.

Figure 3:
FIG. 3 is a section view of the support platform taken along the line 3-3 of FIG. 1.

Two of the inner bridges 101 shown in FIGS. 1 and 3 include the channels 66 extending longitudinally along a medial section of the top surfaces 130. Those channels 66 are shallowly recessed below the top surfaces 130 and thus define slight depressions with respect to the top surfaces 130 of those two side bridges 101. Each channel 66 is bound on two sides by short, upstanding sidewalls 132 projecting upward on either side of the channel 66 from a floor 133 of the channel 66 to the top surface 130.

The channel 66 connects the inner seat 91 with the seat 61 in one of the adjacent side pods 21. The top surface 130 of the inner bridge 101 is coplanar to the top surfaces 60 and 90 of the side pod 21 and the inner pod 22 between which it extends. The channel 66 preferably has the same depth, between its floor 133 and the top surface 130, as do the seats 31 and 91 in the side and inner pods 21 and 22. The channel 66 joins the adjacent seats 61 and 91 in fluid communication with each other. Water or another fluid can flow easily from one seat 61, through the channel 66, to the other seat 91, or vice versa.

The other two inner bridges 101 preferably do not have the channels 66 but instead have vents 134 in the top surfaces 130 coupled to the internal reservoir 18 of the platform 10 in fluid communication. In the embodiment shown in these drawings, the vents 134 are covered with caps 135. The vents 134 are small holes allowing air to move into and out of the reservoir 18 to prevent formation of a vacuum during use of the platform 10.

The sidewall 13 of the platform 10 defines sidewalls 136 of the inner bridge 101. The sidewalls 136 are on opposed sides of the inner bridge 101 and have large, smooth, flat, parallel faces extending from the top surface 130 to the underside 46 of the platform 10.

The inner bridges 101 cooperate with the side bridges 100 to bound and define the voids 19 in the platform 10. In the embodiment shown in the drawings, the voids 19 are cube-shaped hollows.

Each void 19 is bordered on two sides by the sidewalls 136 of two adjacent inner bridges 101 and by the inner sidewalls 115 of two adjacent side bridges 100. Both the sidewalls 136 and the inner sidewalls 115 project into the platform 10 (rather than outwardly, away from the platform) 10, and the sidewalls 136 and 115 are considered inner sidewalls separate from the outer sidewalls defining the outer appearance of the platform, such as those carrying the major faces 35 and 36, the minor faces 38 and 39, the major face 65, and the minor faces 68 and 69. The voids 19 are open at the top 14 and bottom 15 of the platform 10, such that the voids 19 are open to the environment.

The sidewall 13 of the platform 10 isolates the internal reservoir 18 within the platform 10 from that environment. As seen in FIG. 3 and in FIG. 4 (which is a section view taken along the line 4-4 of FIG. 1, the internal reservoir 18 is a large volume within the platform 10 that is unbroken and preferably not compartmentalized. It has a floor, defined as the underside 46 of the platform 10, which extends level across the bottom of most of the platform 10, and an opposed ceiling, defined as the top 14 of the platform 10.

Figure 4:
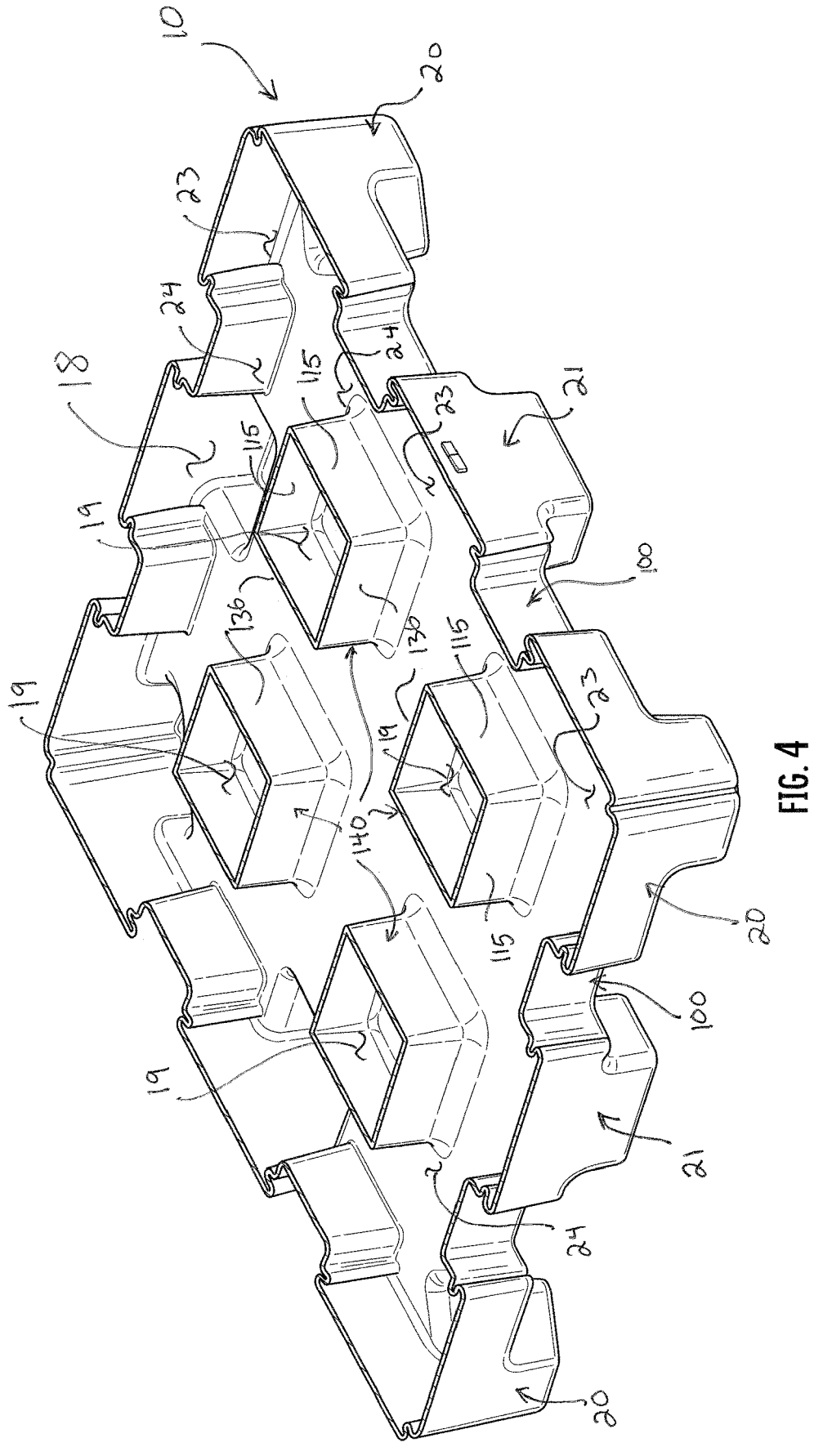
FIG. 4 is a section view of the support platform taken along the line 4-4 of FIG. 1.

Between the floor and ceiling are four pillars 140. The pillars 140 are defined by the inner sidewalls 115 and the sidewalls 136 described just above. The pillars 140 bound the voids 19. The pillars 140 are rectangular in cross-section, as seen in FIG. 4, and provide resistance against vertical crushing of the platform 10 from a load above. The pillars 140 also prevent torsional forces bending the platform 10. The side bridges 100 provide lateral rigidity and stability to the platform 10 across its width.

The internal reservoir 18 is intended to be filled, at least partially, with a liquid such as water. In some embodiments, a drain 141 is formed in the channel (in FIG. 1, the drain 141 is shown near the back of the platform 10). The drain 141 is a hole formed through the floor 63 of a channel 66 in the side pod 21, though it can be formed in other channels 66 as well. Water in the channels 66 will circulate among the channels 66 and seats 31, 61, and 91 until it passes through the drain 141 into the reservoir 18. The water is kept there until it can be pumped out.

To pump water from the reservoir 18, there is at least one access 150 (though in these drawings, there are two). Referring primarily to FIGS. 1 and 3, the access 150 is formed in the seat 61 of a side pod 21. The access 150 can suitably be formed in any seat 31, 61, or 91. The access 150 is a circular hole, slightly smaller than the dimension of the seat 31, with a threaded inner lip forming a mouth 151. The mouth 151 thus bounds and defines the access 150 into the reservoir 18. A cap 152 is threadably engaged with the mouth 151, such that it is removably secured and can be tightened and loosened from the mouth 151 as desired. Normally, the cap 152 will be in place in the mouth 151 and will form a seal therewith, so that water in the channels 66 and the seat 31 will flow around the cap 152 and toward the drain 141.

Figure 5:
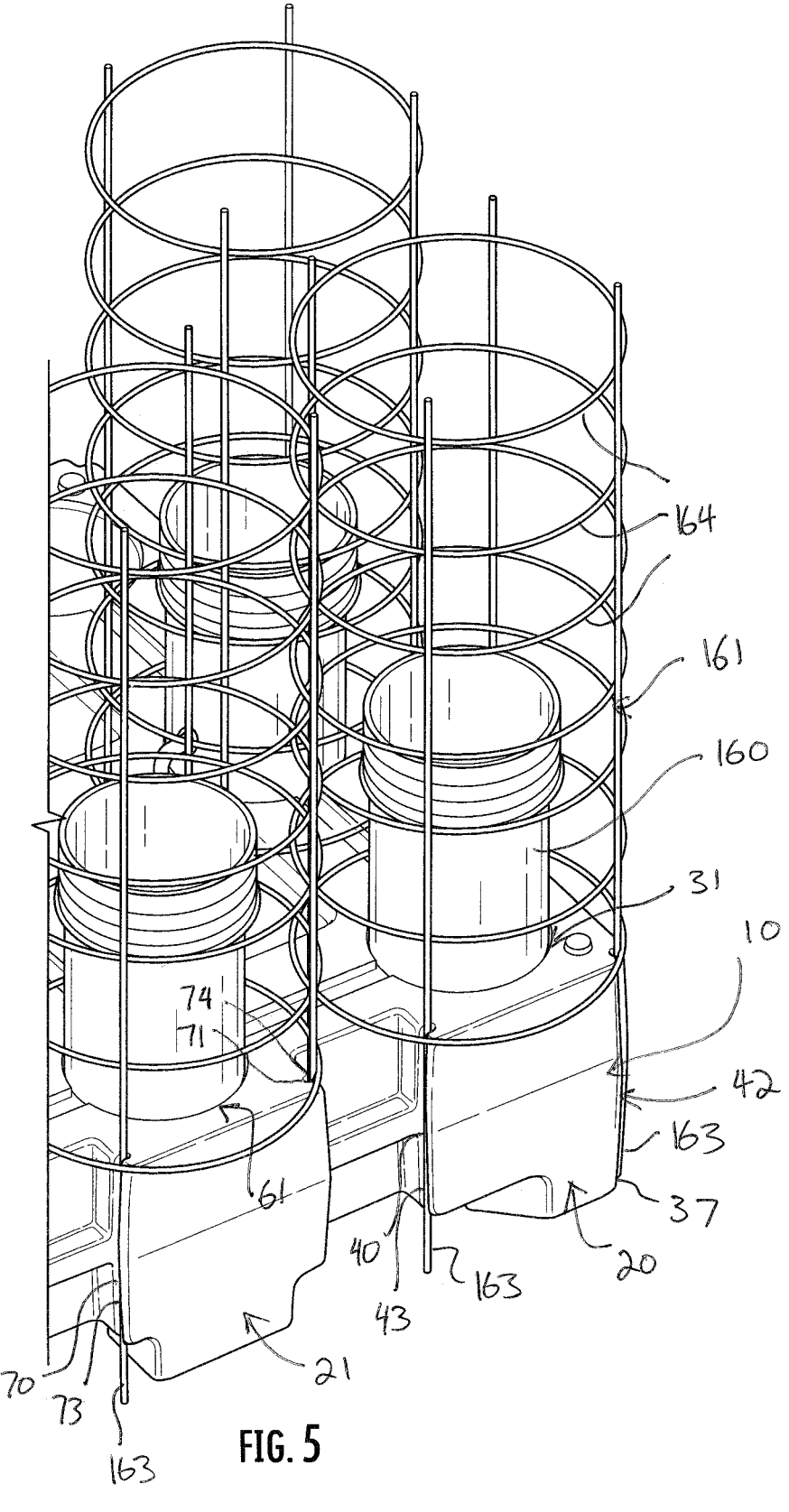
FIG. 5 is an enlarged view of the support platform carrying buckets and cages.

Turning to FIG. 5, in operation, the platform 10 is useful for holding and storing pots or buckets 160 which typically hold growing plants. The inner diameters of the seats 31, 61, and 91 correspond to the outer diameters of the bottom of the buckets 160, such that the buckets 160 fit snugly against the sidewalls 32, 62, and 92 defining the seats 31, 61, and 91, respectively. Interaction between the buckets and these sidewalls prevents the buckets from sliding or tipping during movement of a platform carrying buckets 160.

When the user wants to train and support the plants growing in the buckets, he places a cage 161 around each bucket 160. The cage 161 preferably has vertical rods 163 and horizontal, circular rings 164 attached to the rods 163. The rods 163 snap into the notches around the platform 10.

For example, as shown in FIG. 5, the corner pod 20 shows the notch 42 along the corner 37 and the notch 43 along the corner 40. There is a cage 161 surrounding the bucket 160 located in the seat 31 of this corner pod 20, and that cage 161 has a rod 163 snapped into each of those notches 42 and 43. Another rod 163 is snapped into the notch 44 in the corner 41 but cannot be seen in this view.

Likewise, the side pod 21 shows the notch 73 along the side corner 70. There is a cage 161 surrounding the bucket 160 located in the seat 61 of this side pod 21, and that cage 161 has a rod 163 snapped into the notch 73. Another rod 163 of that cage 161 is snapped into the notch 74 on the opposite side corner 71, as is barely shown in FIG. 5.

Carried in this way, the cages 161 are securely held next to the buckets 160 containing the plants supported by the cages 161. As the plants grow, they grab onto the cages 161 for support. If the platform 10 needs to be moved, all the plants in the buckets 160 are moved along with it and the cages 161.

When the user waters the plants, any extra water will drain out of the bottom of the buckets 160 (if the buckets have drains in the bottom) or will pour over the side of the buckets 160. This extra water gathers in the seats 31, 61, and 91 and then streams into the channels 66 and finally down through the drain 141 into the internal reservoir 18. Water does not pour over the side of the platform 10 and onto the floor of the facility. This keeps the growing facility cleaner and safer. If water needs to be removed from the platform 10, the user can unscrew the cap 152 from the mouth 151, place a pump hose into the reservoir 18, and draw the water out.

In some cases, the user may configure the platform 10 with a pump left at least partially submerged inside the reservoir 18. This pump has outlet tubes that extend out of the access 150 and up to the buckets 160. The pump can be set on a timer so that water is periodically pumped from the reservoir 18 into the buckets 160 to water the growing plants. Marked indicators 165 on the side of the platform indicate the amount of water in the reservoir 18. In FIGS. 1 and 3, the indicators 165 are on the major face 65 of the side pod 21, though they can be on other places on the platform 10.

The platform 10 allows for bucketed plants to be easily grown indoors, in a tent, and/or in an air-conditioned or heated space. The platform 10 can hold a liquid solution for feeding the plants, the buckets 160 for storing the plants, and the cages 161 for supporting the plants while they grow. For example, a user of the platform 10 can place a tent over plants on the platform 10 for about eight weeks with one filling. In other words, if a user fills the internal reservoir 18 of the platform 10 with a liquid solution, the plants supported on the platform 10 will grow for about eight weeks without need for refilling the reservoir 18.

Further, the platform 10 can be initially placed inside, early in the growing season, where the temperature can be precisely controlled, but can then be moved outside once the risk of freeze has passed. Alternatively, plants can be grown inside during the hottest times of the year and then moved outside once temperatures become more moderate or even cool.

For example, tomato plants cannot be put outside if there will be a freeze. Instead, tomato plants can be grown indoors, on the platform 10, to a large height and then moved outside once the weather is predictably warmer. If it appears that a freeze may happen, the platform 10 can be easily moved inside for the night.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A support platform for holding bucketed plants, comprising:

a top and an opposed bottom, a sidewall extending therebetween, and a reservoir bounded by the sidewall;

seats formed into the top, the seats defining depressions recessed below a top surface;

a channel extending between the seats, the channel recessed below the top surface, the channel joining the seats in fluid communication with each other; and a drain in the channel, the drain configured to drain fluid from the channel into the reservoir bounded by the sidewall.

2. The support platform of claim 1, further comprising voids surrounded by an inner sidewall separate from the sidewall of the support platform.

3. The support platform of claim 1, further comprising an inner sidewall, separate from the sidewall of the support platform, which bounds and defines an internal void separated from the reservoir.

4. The support platform of claim 1, wherein at least one of the seats includes a cap removably secured in a mouth in the top, wherein when the cap is removed, the mouth defines an access to the reservoir.

5. The support platform of claim 1, wherein the sidewall includes a corner formed with an inwardly-directed notch extending vertically between the top and bottom.

6. The support platform of claim 1, further comprising a plurality of vertical notches formed into the sidewall, bounding the seats, configured to receive cages around the seats.

7. A support platform for holding plants, comprising:

a top and an opposed bottom, a sidewall extending therebetween, and a reservoir bounded by the sidewall;

seats formed into the top, the seats defining depressions recessed below a top surface;

a drain configured to drain fluid from the seats into the reservoir; and a plurality of vertical notches formed into the sidewall, bounding the seats, configured to receive cages around the seats.

8. The support platform of claim 7, further comprising voids surrounded by an inner sidewall separate from the sidewall of the support platform.

9. The support platform of claim 7, further comprising an inner sidewall, separate from the sidewall of the support platform, which bounds and defines an internal void separated from the reservoir.

10. The support platform of claim 7, wherein at least one of the seats includes a cap removably secured in a mouth in the top, wherein when the cap is removed, the mouth defines an access to the reservoir.

* * * * *